United States Patent
Miyano et al.

(10) Patent No.: US 7,787,687 B2
(45) Date of Patent: Aug. 31, 2010

(54) PATTERN SHAPE EVALUATION APPARATUS, PATTERN SHAPE EVALUATION METHOD, METHOD OF MANUFACTURING SEMICONDUCTOR DEVICE, AND PROGRAM

(75) Inventors: Yumiko Miyano, Tokyo (JP); Tadashi Mitsui, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 975 days.

(21) Appl. No.: 11/589,057

(22) Filed: Oct. 30, 2006

(65) Prior Publication Data
US 2007/0098249 A1 May 3, 2007

(30) Foreign Application Priority Data
Oct. 31, 2005 (JP) .............................. 2005-316036

(51) Int. Cl.
*G06K 9/00* (2006.01)
(52) U.S. Cl. ..................................................... 382/149
(58) Field of Classification Search ................. None
See application file for complete search history.

(56) References Cited

U.S. PATENT DOCUMENTS

| | | | | |
|---|---|---|---|---|
| 4,791,586 A | * | 12/1988 | Maeda et al. | 716/5 |
| 6,374,397 B1 | * | 4/2002 | Miyamoto et al. | 716/21 |
| 6,842,245 B2 | * | 1/2005 | Ando | 356/394 |
| 2003/0142860 A1 | * | 7/2003 | Glasser et al. | 382/144 |
| 2005/0086618 A1 | | 4/2005 | Ito et al. | |
| 2006/0236294 A1 | * | 10/2006 | Saidin et al. | 716/19 |

FOREIGN PATENT DOCUMENTS

| | | |
|---|---|---|
| JP | 61-080011 | 4/1986 |
| JP | 2004-302110 | 10/2004 |
| JP | 2005-98885 | 4/2005 |

OTHER PUBLICATIONS

Tadashi Mitsui, "Pattern Evaluation Method, Pattern Matching Method and Computer Readable Medium", U.S. Appl. No. 11/391,197, filed Mar. 29, 2006.

* cited by examiner

*Primary Examiner*—Brian P Werner
(74) *Attorney, Agent, or Firm*—Finnegan, Henderson, Farabow, Garrett & Dunner, L.L.P.

(57) ABSTRACT

A pattern shape evaluation method includes acquiring design data accompanied by an evaluation area in which information on a particular evaluation area within a pattern of a semiconductor device is added to the design data for the pattern, acquiring an image of the pattern, generating edge data for the pattern from the image of the pattern, aligning the design data accompanied by the evaluation area with the edge data and evaluating the shape of the pattern within the evaluation area after the alignment.

11 Claims, 7 Drawing Sheets

PATTERN SHAPE EVALUATION APPARATUS, PATTERN SHAPE EVALUATION METHOD, METHOD OF MANUFACTURING SEMICONDUCTOR DEVICE, AND PROGRAM

CROSS REFERENCE TO RELATED APPLICATION

This application claims benefit of priority under 35 USC §119 to Japanese patent application No. 2005-316036, filed on Oct. 31, 2005, the contents of which are incorporated by reference herein.

BACKGROUND OF THE INVENTION

1. Field of the Invention

The present invention relates to a pattern shape evaluation apparatus, a pattern shape evaluation method, a method of manufacturing a semiconductor device, and a program.

2. Related Background Art

In a conventional technique for evaluating a pattern of a semiconductor device, a pattern width is measured from an acquired pattern image, and the measured value is compared with a preset value, thereby evaluating the pattern. However, when the shape of the pattern is complicated, it is impossible to accurately judge whether the shape of the pattern is abnormal if the pattern width is measured at one point alone. Therefore, the number of measurement points has to be increased, and this decreases the throughput of the measurement.

In order to solve this problem, there has been proposed a technique wherein an allowable range of a pattern shape is preset, and edge data obtained from a pattern image is judged to find whether it is within the allowable range, thereby evaluating the pattern (refer to Japanese Patent laid open (kokai) No. 2005-98885).

The pattern of the semiconductor device tends to be miniaturized, and it is becoming common to form a pattern whose size is equal to or less than an exposure wavelength. Therefore, the more the pattern is miniaturized, the more easily a difference is made between the design data and the actual pattern, and the actual pattern is far more distorted than the shape of the design data. Corner portions of the pattern especially tend to have a greater margin of error with respect to the design data. There is a possibility that the shape of a mask pattern can not be accurately transferred during exposure.

In general, the pattern requires accuracy in, for example, position or width only in some parts, and there occurs no practical problem even if the shape of the pattern is out of the allowable range in other parts. However, since the margin of error in the shape of the pattern becomes greater as described above along with the progress in the miniaturization of the pattern, the shape deviates from the allowable range in parts that are not essentially important, with the result that the pattern is often judged as defective and a manufacture yield is decreased. Japanese Patent laid open (kokai) No. 2005-98885 discloses no solution for such a problem.

On the other hand, there is also disclosed a technique wherein a particular area is specified in a pattern, and the shape of the pattern is evaluated within that area (refer to Japanese Patent laid open (kokai) No. 61(1986)-80011). However, in Japanese Patent laid open (kokai) No. 61(1986)-80011, the area is manually specified, and there is no disclosure or suggestion as to which area in the pattern the evaluation is desirably conducted in, so that accurate evaluation of the pattern shape is not ensured.

SUMMARY OF THE INVENTION

According to a first aspect of the present invention, there is provided a pattern shape evaluation apparatus comprising:

an evaluation area generator which receives design data for a pattern of a semiconductor device and which adds information on a particular evaluation area within the pattern, to the design data to generate the design data accompanied by the evaluation area;

a pattern edge detector which receives an image of the pattern and then processes the image and which generates edge data for the pattern;

an aligner which aligns the design data accompanied by the evaluation area with the edge data; and a pattern shape measurer which evaluates the shape of the pattern within the evaluation area where the alignment with the edge data has been carried out.

According to a second aspect of the present invention, there is provided a pattern shape evaluation apparatus comprising:

an evaluation area generator which receives an input of design data for a semiconductor device including a first pattern and a second pattern and which adds information on a particular evaluation area within the first pattern or the second pattern, to the design data to generate the design data accompanied by the evaluation area, the second pattern being positioned above the first pattern;

a pattern edge detector which receives an image where the first pattern and the second pattern have been observed and which processes the image to generate edge data for the first pattern and the second pattern;

an aligner which aligns the edge data for the first pattern or the second pattern with the design data accompanied by the evaluation area; and a pattern shape measurer which evaluates, within the evaluation area, the shape of the pattern which is one of the first and second patterns and which is different from the pattern used for the alignment.

According to a third aspect of the present invention, there is provided a pattern shape evaluation method comprising:

acquiring design data accompanied by an evaluation area in which information on a particular evaluation area within a pattern of a semiconductor device is added to the design data for the pattern;

acquiring an image of the pattern;

generating edge data for the pattern from the image of the pattern;

aligning the design data accompanied by the evaluation area with the edge data; and evaluating the shape of the pattern within the evaluation area after the alignment.

According to a fourth aspect of the present invention, there is provided a pattern shape evaluation method comprising:

acquiring design data accompanied by an evaluation area in which information on a particular evaluation area within a first pattern or a second pattern is added to design data for a semiconductor device including the first pattern and the second pattern, the second pattern being positioned above the first pattern;

acquiring an image where the first pattern and the second pattern have been observed;

processing the acquired image and generating edge data for the first pattern and the second pattern;

aligning the edge data for the first pattern or the second pattern with the design data accompanied by the evaluation area; and evaluating, within the evaluation area, the shape of the pattern which is one of the first and second patterns and which is different from the pattern used for the alignment.

According to a fifth aspect of the present invention, there is provided a program which is stored in a medium readable by a computer and which causes the computer to execute a pattern shape evaluation method, the pattern shape evaluation method comprising:

acquiring design data accompanied by an evaluation area in which information on a particular evaluation area within a pattern of a semiconductor device is added to the design data for the pattern;

acquiring an image of the pattern;

generating edge data for the pattern from the image of the pattern;

aligning the design data accompanied by the evaluation area with the edge data; and evaluating the shape of the pattern within the evaluation area after the alignment.

According to a sixth aspect of the present invention, there is provided a program which is stored in a medium readable by a computer and which causes the computer to execute a pattern shape evaluation method, the pattern shape evaluation method comprising:

acquiring design data accompanied by an evaluation area in which information on a particular evaluation area within a first pattern or a second pattern is added to design data for a semiconductor device including the first pattern and the second pattern, the second pattern being positioned above the first pattern;

acquiring an image where the first pattern and the second pattern have been observed;

processing the acquired image and generating edge data for the first pattern and the second pattern;

aligning the edge data for the first pattern or the second pattern with the design data accompanied by the evaluation area; and evaluating, within the evaluation area, the shape of the pattern which is one of the first and second patterns and which is different from the pattern used for the alignment.

According to a seventh aspect of the present invention, there is provided a method of manufacturing a semiconductor device, the method comprising:

acquiring design data accompanied by an evaluation area in which information on a particular evaluation area within a pattern of a semiconductor device is added to the design data for the pattern;

extracting an arbitrary semiconductor substrate from semiconductor substrates in a production lot for the semiconductor device;

acquiring an image of the pattern of the extracted semiconductor substrate;

generating edge data for the pattern from the image of the pattern;

aligning the design data accompanied by the evaluation area with the edge data;

evaluating the shape of the pattern within the evaluation area after the alignment; and manufacturing the semiconductor devices on the semiconductor substrates in the production lot to which the extracted semiconductor substrate belongs when the pattern is evaluated as nondefective.

According to an eighth aspect of the present invention, there is provided a method of manufacturing a semiconductor device, the method comprising:

acquiring design data accompanied by an evaluation area in which information on a particular evaluation area within a first pattern or a second pattern is added to design data for a semiconductor device including the first pattern and the second pattern, the second pattern being positioned above the first pattern;

extracting an arbitrary semiconductor substrate from semiconductor substrates which are in a production lot for the semiconductor device and in which the first and second patterns are formed;

acquiring an image where the first pattern and the second pattern of the extracted semiconductor substrate have been observed;

processing the acquired image and generating edge data for the first pattern and the second pattern;

aligning the edge data for the first pattern or the second pattern with the design data accompanied by the evaluation area;

evaluating, within the evaluation area, the shape of the pattern which is one of the first and second patterns and which is different from the pattern used for the alignment; and manufacturing the semiconductor devices on the semiconductor substrates in the production lot to which the extracted semiconductor substrate belongs when the pattern different from the pattern used for the alignment is evaluated as nondefective.

DETAILED DESCRIPTION OF THE INVENTION (1) First Embodiment

Figure 1:
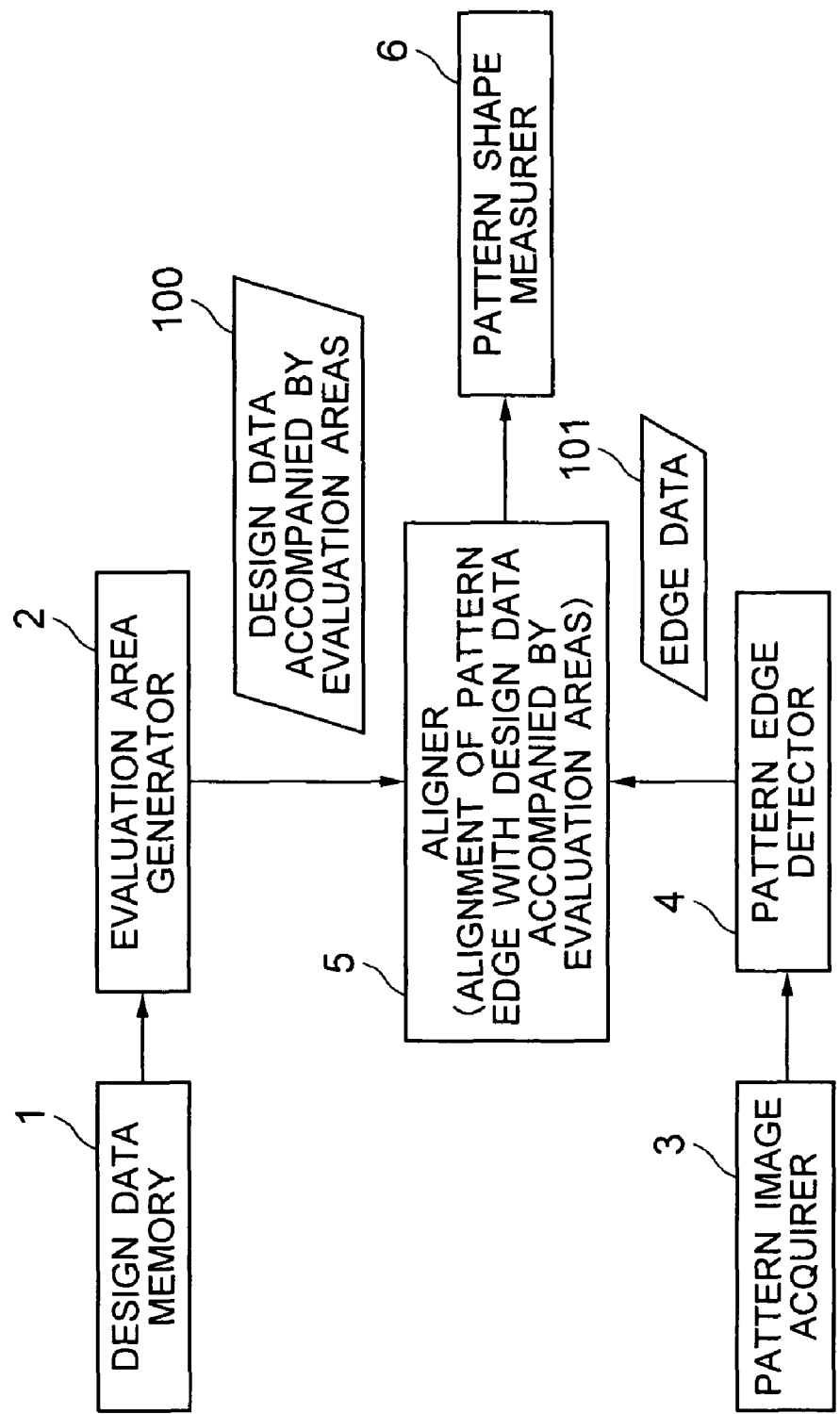
FIG. 1 is a block diagram showing a schematic configuration of a pattern shape evaluation apparatus according to a first embodiment of the present invention.

FIG. 1 is a block diagram showing a schematic configuration of a pattern shape evaluation apparatus according to a first embodiment of the present invention. The pattern shape evaluation apparatus in FIG. 1 comprises a design data memory 1, an evaluation area generator 2, a pattern image acquirer 3, a pattern edge detector 4, an aligner 5, and a pattern shape measurer 6.

The design data memory 1 stores design data for a pattern of a semiconductor device. This design data is generated by an unshown design data generator. The design data generator repeats a device simulation until a semiconductor device having desired electric properties is obtained, and finally generates design data. It is to be noted that there is no necessity of incorporating the design data generator in the pattern shape evaluation apparatus in FIG. 1, and, for example, the design data alone may be provided from a device manufacturer and stored in the design data memory 1.

The evaluation area generator 2 sets a partial area (hereinafter, an evaluation area 11) in the pattern in which a shape evaluation should be conducted on the basis of instruction by an operator, and generates design data accompanied by evaluation areas in which information on the positions of the set evaluation areas 11 is synthesized with design data 12. The evaluation area 11 is an important part in, for example, the operation of the device, and more specifically, is an area or the like where a plurality of patterns overlap each other.

Figure 2A:
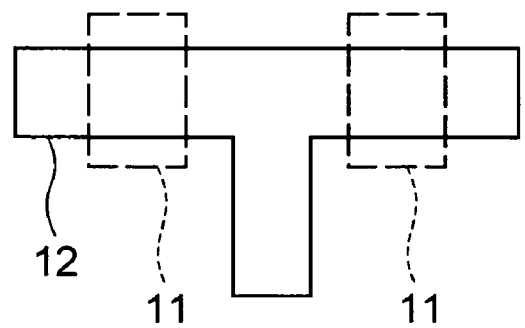
FIG. 2A is a diagram showing one example of evaluation areas set in a pattern.
Figure 2B:
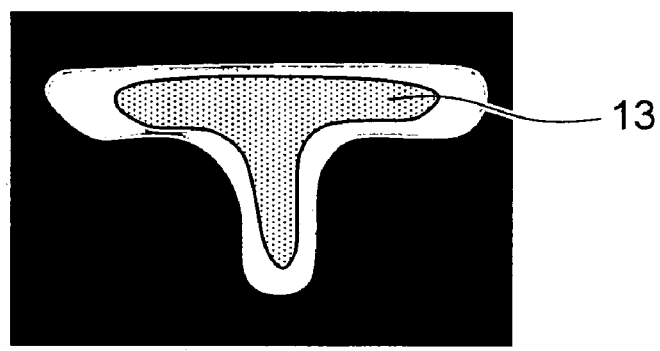
FIG. 2B is a diagram showing a pattern image corresponding to the pattern shown in FIG. 2A.
Figure 2C:
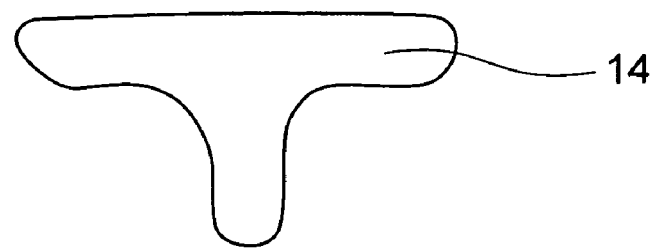
FIG. 2C is a diagram showing edge data 14 extracted from the pattern image shown in FIG. 2B.

FIG. 2A is a diagram showing one example of the evaluation areas 11 set in the pattern. FIG. 2B is a diagram showing a pattern image 13 which corresponds to the pattern shown in FIG. 2A and which has been obtained by an SEM. FIG. 2C is a diagram showing edge data 14 extracted from the pattern image 13. A hatched area in the pattern image 13 in FIG. 2B indicates that a difference in grey level is generated due to, for example, the difference of material in the pattern image 13 (taper angles of the pattern).

In the example of FIG. 2A, the two evaluation areas 11 are set at symmetric positions in the T-shaped pattern. The evaluation area 11 in FIG. 2A is rectangular, but the shape of the evaluation area 11 is not specifically limited, and any shape is applicable, such as a polygonal, round or elliptic shape. One of the characteristics of the present embodiment is that even the evaluation area 11 with a complicated shape can be set.

The operation of setting the evaluation area 11 may be visually performed by an operator while the pattern image 13 is displayed on a display, but the evaluation area 11 may be fully automatically set by automatically judging the most important portion in the operation of the device. One example for method of automatic judgment of an important portion is weighting design data in advance with respect to a pattern which is relatively finer or more critical in design, and then a portion to be extracted is selected in accordance with requested specifications of an end product by use of the weight on design thereof.

Alternatively, on the basis of results of a simulation (hereinafter, a lithography simulation) for predicting results of lithography becoming factors of causing a pattern defect, the evaluation area 11 may be set in a place (hot spot) where great deformation of the pattern is expected. In this case, the evaluation area 11 can be automatically set on the basis of the results of the lithography simulation.

The design data 12 is in the data format of, for example, GDS data. The GDS data is generally used for design data of a semiconductor device. Incorporating an evaluation area to the design (GDS) data has the following advantages:

1) It is easy to set and check the evaluation area;

2) The evaluation area can be set by a layer number in alignment and evaluation.

The pattern image acquirer 3 in FIG. 1 acquires a pattern image of the semiconductor device (step S1). Where the pattern image is acquired is not specifically questioned. It may be acquired in, for example, a scanning electron microscope (SEM), or in other pattern shape evaluation apparatuses. It is to be noted that the pattern shape evaluation apparatus in the present embodiment further comprises a coordinate data conversion unit (not shown), such that a coordinate system can be converted between coordinate data in the pattern shape evaluation apparatus and the GDS data.

The aligner 5 in FIG. 1 aligns the edge data 14 detected by the pattern edge detector 4 with the design data accompanied by the evaluation areas. Then, the pattern shape measurer 6 evaluates the pattern shape in the evaluation areas 11 on the basis of the edge data 14 and the design data accompanied by the evaluation areas that have been aligned.

Figure 3:
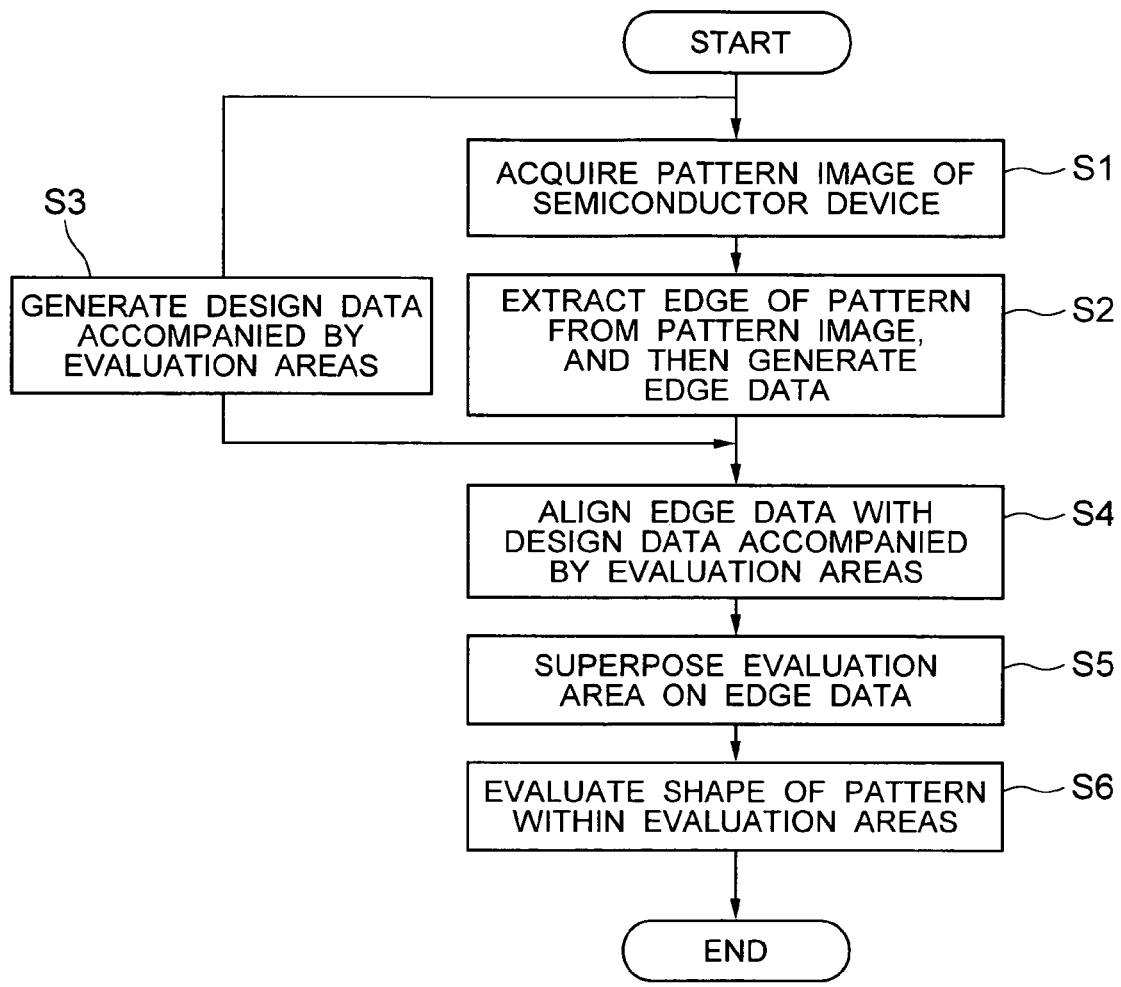
FIG. 3 is a flowchart showing one example of a processing procedure of the pattern shape evaluation apparatus in FIG. 1.

FIG. 3 is a flowchart showing one example of a processing procedure of the pattern shape evaluation apparatus in FIG. 1. A processing operation in the present embodiment will be described below in accordance with this flowchart. First, the pattern image acquirer 3 acquires the pattern image 13 of the semiconductor device (step S1).

Next, the pattern edge detector 4 extracts an edge of the pattern on the basis of the acquired pattern image 13, thereby generating the edge data 14 (step S2). Here, white band of the pattern edge in the pattern image 13 is utilized to detect a luminance difference, thereby extracting the edge.

Before and after the processing in steps S1 and S2, the evaluation area generator 2 synthesizes the evaluation area 11 with the design data 12 acquired from the design data memory 1 to generate the design data accompanied by the evaluation areas 100 (step S3).

Figure 4A:
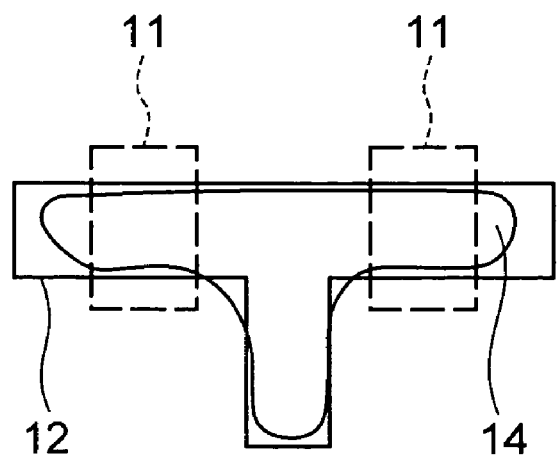
FIG. 4A is a diagram showing an example in which the edge data corresponding to the pattern image shown in FIG. 2B is aligned with design data accompanied by evaluation areas so that they overlap each other.

Next, the aligner 5 aligns the edge data 14 with the design data accompanied by the evaluation areas 100 (step S4), and superposes the evaluation area 11 on the edge data 14 (step S5). FIG. 4A shows an example in which the edge data 14 corresponding to the pattern image 13 in FIG. 2B is aligned with the design data accompanied by the evaluation areas so that they overlap each other.

Next, the pattern shape measurer 6 evaluates the shape of the pattern in the evaluation areas 11. More specifically, the pattern shape measurer 6 sets tolerance data 15 of FIG. 4B indicating an allowable range of the error in the shape of the pattern, and judges whether or not the edge data 14 is within the range of the tolerance data 15 in the evaluation areas 11 (step S6).

Figure 4B:
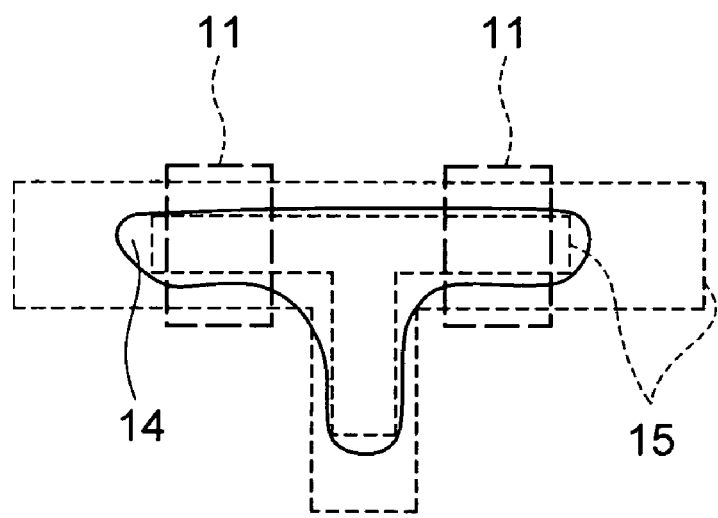
FIG. 4B is a diagram showing an example in which the edge data accompanied by the evaluation areas and tolerance data overlap each other.

FIG. 4B is a diagram showing an example in which the edge data 14 accompanied by the evaluation areas 11 and the tolerance data 15 overlap each other. In this drawing, the tolerance data 15 is indicated by thin dotted lines. As shown, the tolerance data 15 includes upper limit data representing the maximum limit of the shape error of the pattern, and lower limit data representing the minimum limit. The upper limit data and the lower limit data are set with reference to the design data accompanied by the evaluation areas. More specifically, a shape greater than the design data 12 in a predetermined proportion (there is a possibility that the degree of proportion is changed depending on the place of the pattern) is set as the upper limit data, while a shape smaller than the design data 12 in a predetermined proportion is set as the lower limit data.

The judgment is NG (shape abnormality present) if the edge data 14 within the evaluation areas 11 intersects with the tolerance data 15, while the judgment is OK (no shape abnormality) if there is no intersection. In the case of FIG. 4B, the edge data 14 does not interest with the tolerance data, so that the judgment is OK, and the shape of the pattern is judged to be free of abnormality.

It is to be noted that when the shape of the pattern is evaluated, another technique may be used instead of using the tolerance data 15 to evaluate the shape of the pattern. Alternatively, the width between the opposite edges of the pattern in the evaluation areas 11 may be measured, and the shape of the pattern may be evaluated in accordance with this width.

In this manner, in the first embodiment, the evaluation areas 11 are set in the particular portions in the pattern, and the shape of the pattern in the evaluation areas 11 is evaluated to find whether or not it is abnormal, such that there occurs no problem that the entire pattern is regarded as NG due to a shape error of a part of little importance in the pattern, the manufacture yield of the pattern is improved, and the shape of the pattern can be rapidly and accurately evaluated.

The example has been described above in which the two evaluation areas 11 are set in the pattern, but the evaluation areas 11 are not specifically limited in number, place and size. When a plurality of evaluation areas 11 are set, the standards of the pattern evaluation in the respective evaluation areas 11 may be the same, or an evaluation standard different from others may be provided in at least some of the evaluation areas 11. In that case, the pattern evaluation may be carried out for each of the evaluation areas 11, or the pattern evaluations may be carried out at the same time regarding the plurality of evaluation areas 11 as one separated area.

(2) Second Embodiment

A second embodiment is directed to a case where patterns targeted for evaluation have a multilayer structure with two or more layers.

A block configuration of a pattern shape evaluation apparatus according to the second embodiment is substantially the same as that in FIG. 1, and is not described.

Figure 5:
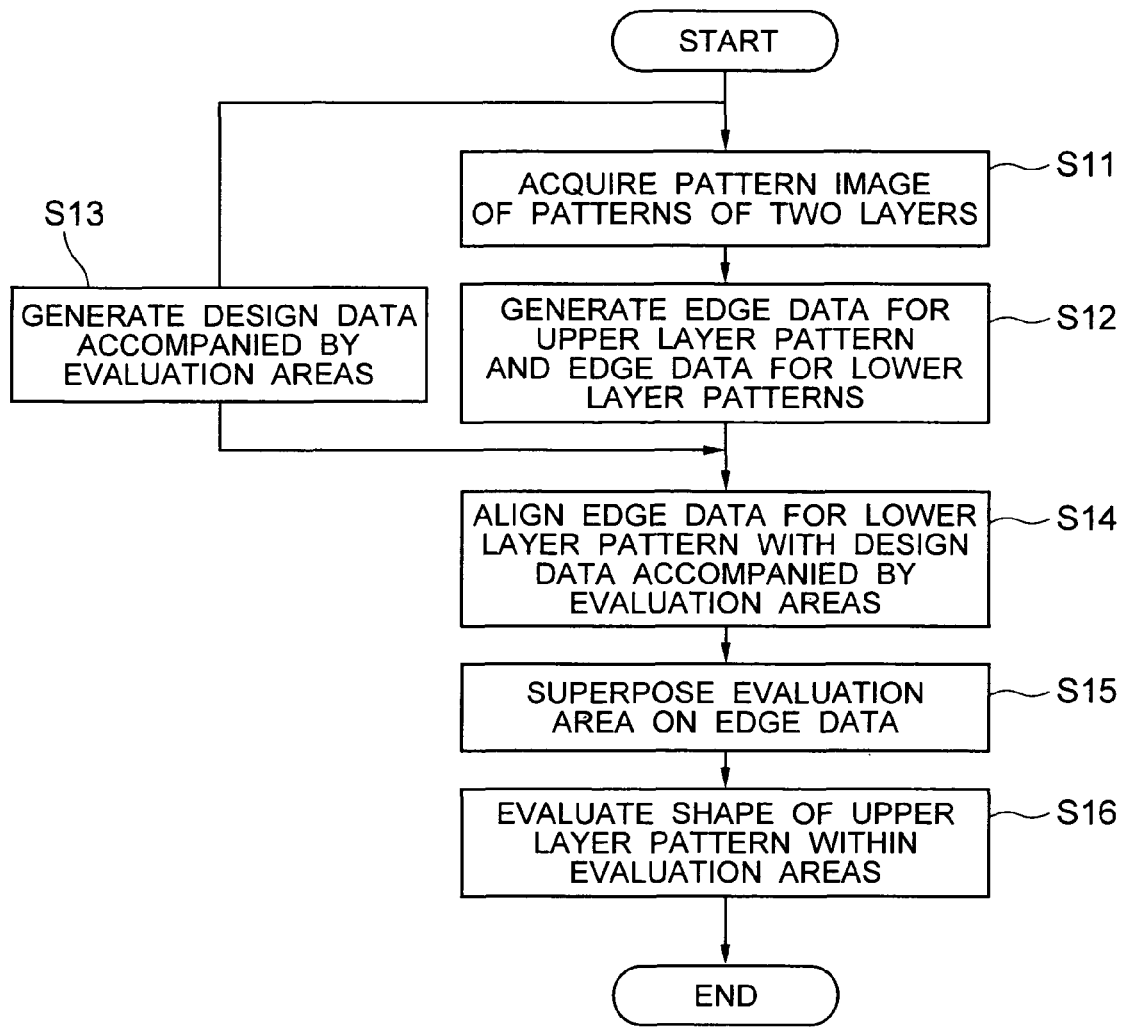
FIG. 5 is a flowchart showing a processing procedure of a pattern shape evaluation apparatus according to a second embodiment of the present invention.

FIG. 5 is a flowchart showing a processing procedure of the pattern shape evaluation apparatus according to the second embodiment. First, a pattern image acquirer 3 acquires a pattern image 13 containing patterns of two or more layers (step S11). In acquiring the pattern image 13, imaging may be carried out so that all the necessary patterns are simultaneously observed. However, the acquisition of the pattern image 13 is not limited thereto, and the patterns may be separately imaged and then arranged by alignment during generation of their edge data utilizing a reference pattern, for example.

Figure 6A:
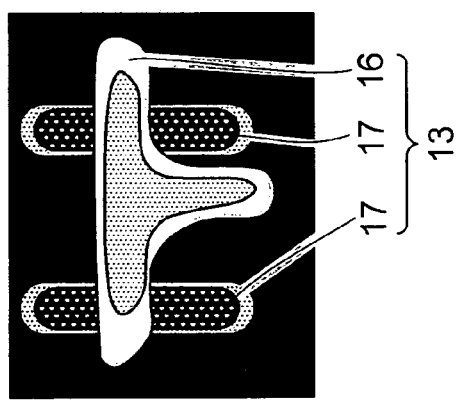
FIG. 6A is a diagram showing one example of an acquired image of the pattern.

Hereinafter, it is assumed that a sample targeted for evaluation has the patterns of two layers and that an upper layer pattern 16 is the pattern to be evaluated. FIG. 6A is a diagram showing one example of the acquired pattern image 13. In this example, the upper layer pattern 16 targeted for evaluation is a T-shaped gate electrode, and lower layer patterns 17 are diffusion layer patterns.

Figure 6B:
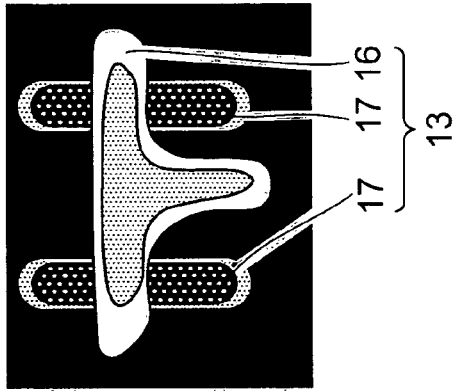
FIG. 6B is a diagram showing an ideal image of the pattern.

As understood from FIG. 6A, because the upper layer pattern 16 and the lower layer patterns 17 partly overlap each other, parts of the lower layer patterns 17 are hidden under the upper layer pattern 16. The gate electrode in FIG. 6A is ideally disposed at an intermediate position between the diffusion layer patterns on both sides as shown in FIG. 6B, but is formed closer to one of the diffusion layer patterns due to the mismatch of the patterns during manufacture. Hatched areas in the pattern image 13 shown in FIGS. 6A and 6B indicate a luminance difference resulting from differences in the taper angles, materials, etc. of the patterns.

Figure 6C:
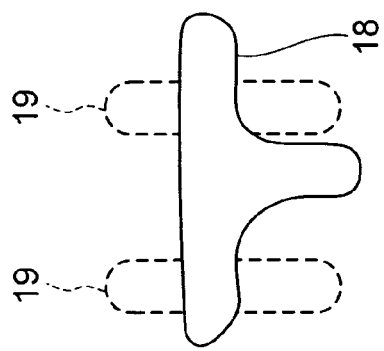
FIG. 6C is a diagram showing edge data for the pattern in FIG. 6A.

Next, a pattern edge detector 4 generates edge data 18 for the upper layer pattern 16 and edge data 19 for the lower layer patterns 17 on the basis of the acquired pattern image 13 (step S12). As in the first embodiment, white glimmering of the pattern edges in the pattern image 13 is utilized to generate the edge data 18 and 19. The edge data 18 and 19 in this case are, for example, as shown in FIG. 6C.

Since the upper layer pattern 16 and the lower layer patterns 17 are different in material and shape, and each of them has different luminance in the pattern image 13. Therefore, the luminance in the pattern image 13 is detected to individually select the upper layer pattern 16 and the lower layer patterns 17, such that edge data 18 and 19 can be generated.

Figure 6D:
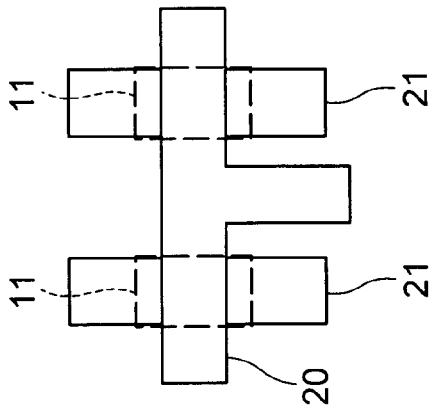
FIG. 6D is a diagram showing design data accompanied by evaluation areas for the pattern in FIG. 6A.

Before and after the processing in steps S11 and S12, an evaluation area generator 2 generates design data accompanied by evaluation areas (step S13). FIG. 6D shows an example of the design data accompanied by the evaluation areas. In the example of this drawing, evaluation areas 11 are set in areas where the upper layer pattern 16 (gate electrode pattern) and the lower layer patterns 17 (diffusion layer pattern) overlap each other. Since the design data itself has no positional displacement or shape error of the pattern, the upper layer pattern 16 is disposed in the middle of the two lower layer patterns 17 in design data 20 and 21 of the present embodiment, as shown in FIG. 6D.

It is to be noted that the evaluation areas 11 are set in the areas where the upper layer pattern 16 and the lower layer patterns 17 overlap each other in the present embodiment because transistors are formed in the vicinity of the areas where these patters overlap each other when the upper layer pattern 16 is a gate electrode and the lower layer patterns 17 are diffusion layers. This makes it possible to detect a problem in the manufacture of the transistor which is an important circuit element in a semiconductor device. In the example of FIG. 6A, since the transistors are formed in the areas where the lower layer patterns 17 and the upper layer pattern 16 overlap each other, a total of two transistors are formed.

Figure 7A:
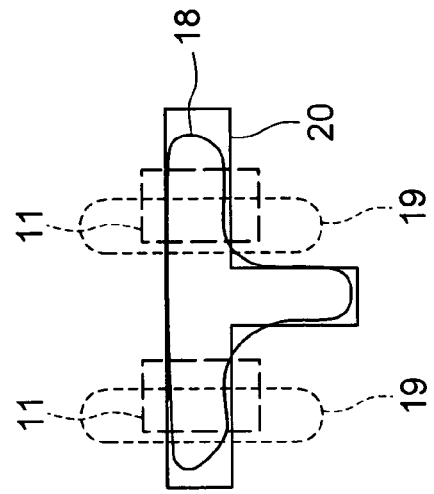
FIG. 7A is a diagram showing a situation where alignment is carried out.

Next, an aligner 5 aligns the edge data 18 and 19 with the design data accompanied by the evaluation areas. The alignment is carried out by contrasting the edge data 19 corresponding to the lower layer patterns 17 with the design data accompanied by the evaluation areas, without using the edge data 18 corresponding to the upper layer pattern 16 (step S14). As a result, the evaluation areas 11 are set in the areas where the upper layer pattern 16 and the lower layer patterns 17 overlap each other, as shown in FIG. 7A (step S15).

Figure 7B:
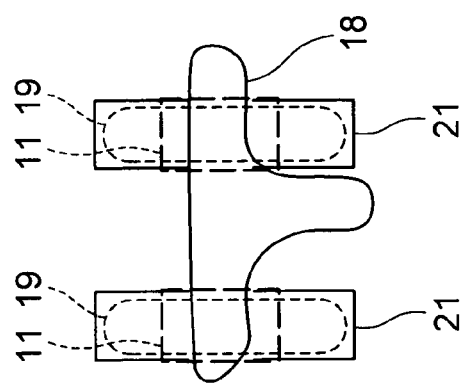
FIG. 7B is a diagram showing an example where the positions of the evaluation areas are displaced when the alignment is carried out.

Here, if the edge data 18 corresponding to the upper layer pattern 16 is aligned with the design data accompanied by the evaluation areas, the evaluation areas 11 are set in places off the areas where the upper layer pattern 16 and the lower layer patterns 17 overlap each other as shown in FIG. 7B, so that the pattern shape can not be correctly evaluated. Thus, when the multilayer patterns are aligned with the design data 20 and 21, it is desirable that a contrast be made between the edge data 19 corresponding to the lower layer patterns and the design data 21. In the present embodiment, the edge data 19 is aligned with the design data 21 because the lower layer patterns are used as a reference to decide the positions of the evaluation areas 11, but the reference patterns for positioning the evaluation areas 11 may be changed to other patterns in accordance with the contents of the evaluation and the kind of patterns.

Figure 7C:
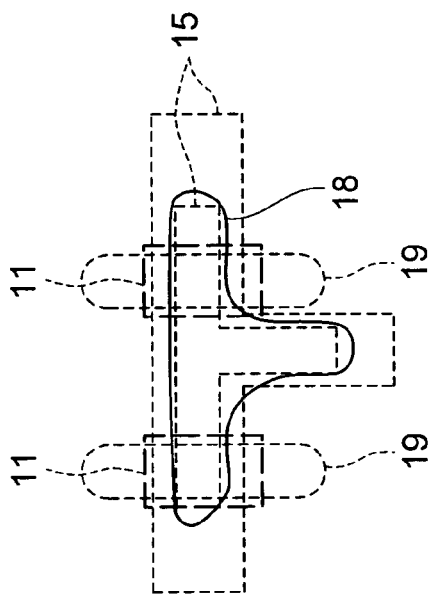
FIG. 7C is a diagram showing a situation where tolerance data is set.

Next, the pattern shape measurer 6 sets tolerance data 15 corresponding to the design data 20, and thus evaluates the shapes of the patterns in the evaluation areas 11. FIG. 7C is a diagram showing a situation where the tolerance data 15 is set. In this drawing, lower limit data indicating the lower limit of the allowable range of the pattern and upper limit data indicating the upper limit are shown by dotted lines as the tolerance data 15. In the example of FIG. 7C, the edge data 18 and 19 are located within the range of the tolerance data 15 in the evaluation areas 11, so that the shapes of the patterns are judged to be free of abnormality.

While the example has been described above in which the shapes of the patterns comprising two layers are evaluated, the evaluation can be conducted in the same procedure when the shapes of the multilayer patterns having three or more layers is evaluated. In this case, after the alignment is carried out using patterns out of the multilayer patterns (e.g., the lower layer patterns) as a standard, the shapes of the particular patterns may be evaluated in the evaluation areas 11.

In this manner, in the second embodiment, when the shapes of the patterns comprising a plurality of layers are evaluated, the evaluation areas 11 can be set in desired places within the patterns to evaluate the shapes of the patterns even if the shapes or positions of the patterns are off the design data 20 and 21, thereby making it possible to simply and accurately evaluate the shapes of the patterns.

(3) Program and Recording Medium

A series of procedures of the pattern shape evaluation method described above may be incorporated in a program, and the program may be read into and executed by the computer capable of image processing. This enables the pattern shape evaluation method according to the present invention to be achieved by use of a general-purpose control computer. Moreover, the series of procedures of the pattern shape evaluation method described above may be stored in a recording medium such as a flexible disk or a CD-ROM as the program to be executed by the computer, and may be read into and executed by the computer.

The recording medium is not limited to a portable medium such as a magnetic disk or an optical disk, and may be a fixed recording medium such as a hard disk drive or a memory. Further, the program incorporating the series of procedures of the pattern shape evaluation method described above may be distributed via a communication line (including wireless communication) such as the Internet. Moreover, the program incorporating the series of procedures of the pattern shape evaluation method described above may be distributed in an encrypted, modulated or compressed state via a wired line such as the Internet or a wireless line or in a manner stored in a recording medium.

(4) Method of Manufacturing Semiconductor Device

If a semiconductor device is manufactured in a process which uses the pattern shape evaluation method described above and which includes simple and highly accurate inspection steps, it is possible to manufacture the semiconductor device with a high throughput and a high yield ratio.

More specifically, a semiconductor substrate is extracted per production lot, and a pattern formed in the extracted semiconductor substrate is inspected by the pattern shape evaluation method described above. When the pattern is judged as nondefective as a result of the inspection, the rest of the manufacturing process is continued for the whole production lot to which the inspected semiconductor substrate belongs. On the other hand, when the pattern is judged as defective and can be reworked as a result of the inspection, rework processing is executed for the production lot to which the semiconductor substrate judged as defective belongs. When the rework processing is finished, the semiconductor substrate is extracted from the production lot and again inspected. If the extracted semiconductor substrate is judged as nondefective as a result of the reinspection, the rest of the manufacturing process is executed for the production lot finished with the rework processing. In addition, when the rework processing is impossible, the production lot to which the semiconductor substrate judged as defective belongs is disposed of, and the cause of the defect is analyzed and fed back to a person in charge of designing, a person in charge of an upstream process or the like.

What is claimed is:

1. A pattern shape evaluation apparatus comprising:
an evaluation area generator which receives an input of design data for a semiconductor device including a first pattern in a lower layer and a second pattern in an upper layer and which adds information on a particular evaluation area within the first pattern or the second pattern, to the design data to generate the design data accompanied by the evaluation area;
a pattern edge detector which receives an image of both the first and second patterns and which processes the image to generate edge data for the first and second patterns;
an aligner which aligns the edge data for one of the first and second patterns with corresponding design data accompanied by the evaluation area; and
a pattern shape measurer which evaluates the other of the first and second patterns within the evaluation area accompanying the design data of the aligned pattern, using the edge data of the other of the first and second patterns.

2. The pattern shape evaluation apparatus according to claim 1,
wherein the evaluation area generator produces the evaluation area from an area where the first and second patterns vertically overlap.

3. The pattern shape evaluation apparatus according to claim 1,
wherein the evaluation area generator sets the evaluation area in a particular site within the first pattern or the second pattern on the basis of a pattern shape obtained by a lithography simulation.

4. The pattern shape evaluation apparatus according to claim 3,
wherein the evaluation area generator addresses the evaluation area at the position where great deformation is expected by the lithography simulation.

5. A pattern shape evaluation method comprising:
acquiring design data accompanied by an evaluation area in which information on a particular evaluation area within a first pattern in a lower area or a second pattern in an upper layer is added to design data for a semiconductor device including the first pattern and the second pattern;
acquiring an image of both the first and second patterns;
generating edge data for the first pattern and the second pattern by processing the acquired image;
aligning the edge data for one of the first and second patterns with corresponding design data accompanied by the evaluation area; and
evaluating the other of the first and second patterns within the evaluation area accompanying the design data of the aligned pattern, using the edge data of the other of the first and second patterns.

6. The pattern shape evaluation method according to claim 5,
wherein the evaluation area is produced from an area where the first and second patterns vertically overlap.

7. The pattern shape evaluation method according to claim 5,
wherein the evaluation area is set in a particular site within the first pattern or the second pattern on the basis of a pattern shape obtained by a lithography simulation.

8. The pattern shape evaluation method according to claim 7,
wherein the evaluation area is addressed at the position where great deformation is expected by the lithography simulation.

9. The pattern shape evaluation method according to claim 5,
wherein the pattern used for the alignment is the first pattern.

10. A computer readable medium storing a program to cause a computer to execute a pattern shape evaluation, the pattern shape evaluation comprising:
acquiring design data accompanied by an evaluation area in which information on a particular evaluation area within a first pattern in a lower layer or a second pattern in an upper layer is added to design data for a semiconductor device including the first pattern and the second pattern;
acquiring an image of both the first and second patterns;
generating edge data for the first pattern and the second pattern by processing the acquired image;
aligning the edge data for one of the first and second patterns with corresponding design data accompanied by the evaluation area; and
evaluating the other of the first and second patterns within the evaluation area accompanying the design data of the aligned pattern, using the edge data of the other of the first and second patterns.

11. A method of manufacturing a semiconductor device, the method comprising:
acquiring design data accompanied by an evaluation area in which information on a particular evaluation area within a first pattern in a lower layer or a second pattern in an upper layer is added to design data for a semiconductor device including the first pattern and the second pattern;
extracting an arbitrary semiconductor substrate from semiconductor substrates which are in a production lot for the semiconductor device and on which the first and second patterns are formed;
acquiring an image of both the first and second patterns;
generating edge data for the first pattern and the second pattern by processing the acquired image;
aligning the edge data for one of the first and second patterns with corresponding design data accompanied by the evaluation area; and
evaluating the other of the first and second patterns within the evaluation area accompanying the design data of the aligned pattern, using the edge data of the other of the first and second patterns; and
manufacturing the semiconductor devices on the semiconductor substrates in the production lot to which the extracted semiconductor substrate belongs when the other of the first and second patterns is evaluated as nondefective.

* * * * *